United States Patent [19]
Genestre et al.

[11] Patent Number: 5,628,687
[45] Date of Patent: May 13, 1997

[54] INTERMEDIATE ROLLER ELEMENT FOR UNIVERSAL JOINT

[75] Inventors: Robert Genestre, Arnouville les Mantes par Septeuil; Claude Neviani, Meulan; François Verbrugge, Cergy Pontoise Cedex, all of France

[73] Assignee: GKN Automotive AG, Siegburg, Germany

[21] Appl. No.: 219,376

[22] Filed: Mar. 29, 1994

[30] Foreign Application Priority Data

Mar. 29, 1993 [FR] France ................... 93 03608

[51] Int. Cl.⁶ ......................................... F16D 3/20
[52] U.S. Cl. .................. 464/111; 464/122; 464/905
[58] Field of Search ........................ 464/111, 120, 464/122, 139, 167, 168, 152, 905; 384/49, 51

[56] References Cited

U.S. PATENT DOCUMENTS

| | | | |
|---|---|---|---|
| 4,275,799 | 6/1981 | Guimbretiere | 464/111 X |
| 4,741,723 | 5/1988 | Orain | 464/120 X |
| 5,125,873 | 6/1992 | Welschof | 464/111 |
| 5,184,978 | 2/1993 | Fillmore et al. | 464/111 |
| 5,254,038 | 10/1993 | Schneider | 464/111 |

FOREIGN PATENT DOCUMENTS

| | | | |
|---|---|---|---|
| 3936602 | 5/1991 | Germany . | |
| 2246835 | 2/1992 | United Kingdom . | |
| 92/15797 | 9/1992 | WIPO | 464/111 |
| 92/19879 | 11/1992 | WIPO . | |

Primary Examiner—Daniel P. Stodola
Assistant Examiner—Eileen A. Dunn
Attorney, Agent, or Firm—Wenderoth, Lind & Ponack

[57] ABSTRACT

An intermediate roller element for a universal joint includes a strip (12), one face of which includes at least one longitudinal roller track and balls (20) which roll along the track. The balls are held by a cage (22) produced in the form of a plate (24) which extends in a plane substantially parallel to the overall plane of the track (16), and includes cells in which the balls (20) are received. The cage includes portions (28, 32, 34) joining the cage (22) to the strip in order to form a unitary sub-assembly.

19 Claims, 3 Drawing Sheets

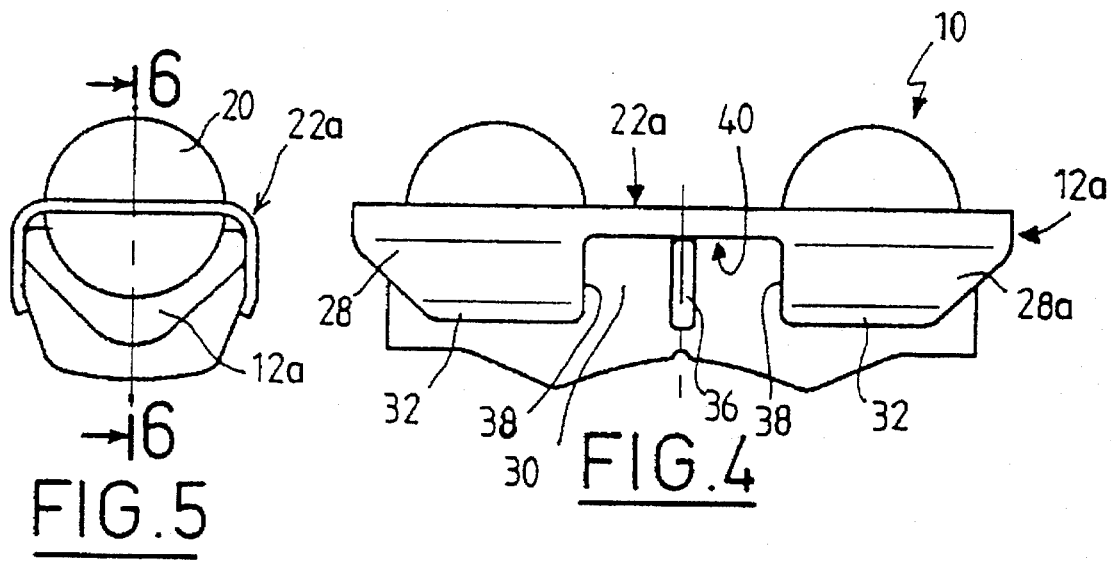
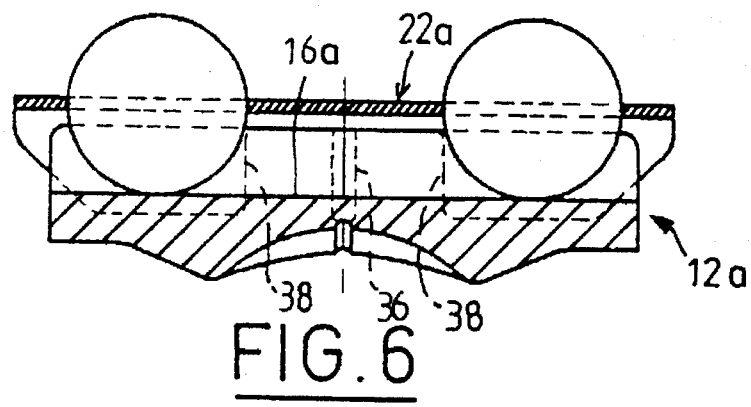
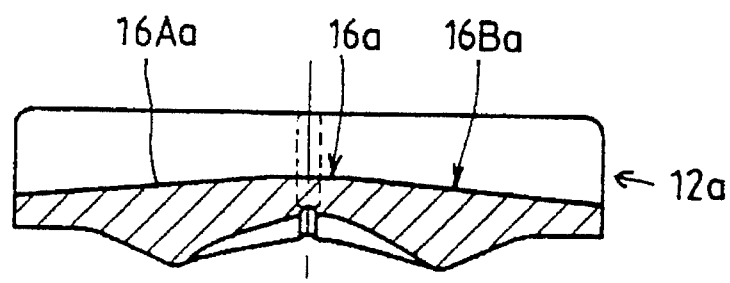

5,628,687

INTERMEDIATE ROLLER ELEMENT FOR UNIVERSAL JOINT

BACKGROUND OF THE INVENTION

The present invention relates to an intermediate roller element for a universal joint.

The invention relates more particularly to a roller element for a universal joint of the type described and represented in patent document FR-A-2,580,751.

According to this design of a universal joint, termed a ball-type triplane joint, recourse is made to an intermediate roller assembly, which is arranged between one arm of the tripod and a raceway formed opposite in the barrel of the joint, of the type including a sole-plate produced in the form of a strip. One face includes at least one longitudinal roller track and balls which roll along the track and which are held by a cage produced in the form of a plate which extends in a plane substantially parallel to the overall plane of the track and which includes cells in which the balls are received.

This design of an intermediate roller assembly makes it possible to obtain satisfactory operation of the joint, but it makes assembly of the latter particularly complicated, insofar as it is necessary to install a great number of components. In particular, the strip, the balls and the cage make assembly operations particularly difficult to automate.

SUMMARY OF THE INVENTION

In order to overcome these drawbacks, the invention proposes an intermediate roller assembly of the type mentioned previously that includes a means for joining the cage to the strip in order to constitute a unitary sub-assembly.

According to other characteristics of the invention, the cage includes at least two opposing lateral tabs, each of which extends from a longitudinal edge of the cage in the direction of the strip, and the free ends of which each interact with a retaining surface formed opposite on the strip in order to limit the displacement of the cage with respect to the strip in a direction perpendicular to each plate of the track. Each lateral tab extends along a lateral face of the strip and the free end of the strip interacts with a fastening face formed opposite on the said lateral face.

An intermediate roller element includes a means for limiting the displacements of the cage with respect to the strip in the longitudinal rolling direction of the balls. This means includes a stop piece formed on the track so that it projects and splits the track into two tracks, on each of which at least one ball rolls.

This means also includes at least one fixed stop piece formed on the strip which is capable of interacting with at least one stop-piece surface of the cage.

The strip includes, on at least one of its lateral faces, one projecting stop piece which is received with a clearance between two stop-piece surfaces made up of the longitudinal end edges of a window formed in one of the lateral tabs of the cage. The strip also includes, at least on one of its lateral faces, two projecting stop pieces which are arranged respectively in the vicinity of the opposing longitudinal ends of this lateral face, and between which stop pieces one of the two lateral tabs of the cage is received with a clearance. The lateral tabs of the case are elastically deformable in order to allow the case to be installed on the strip by elastically clipping it in. Each cell is shaped such as to join the balls to the unit sub-assembly.

BRIEF DESCRIPTION OF THE DRAWINGS

Other characteristics and advantages of the invention will emerge upon reading the detailed description which follows, for the understanding of which reference will be made to the appended drawings, in which:

FIG. 4 is a lateral elevational view of a second embodiment of an intermediate roller element produced in accordance with the teachings of the present invention;

FIG. 5 is a right-hand lateral view of the roller element illustrated in FIG. 4;

FIG. 6 is a sectional view taken on line 6—6 of FIG. 5;

FIG. 11 illustrates a further variant of the shape of a roller track; and

DETAILED DESCRIPTION OF THE PREFERRED EMBODIMENTS

Figures 1, 2:
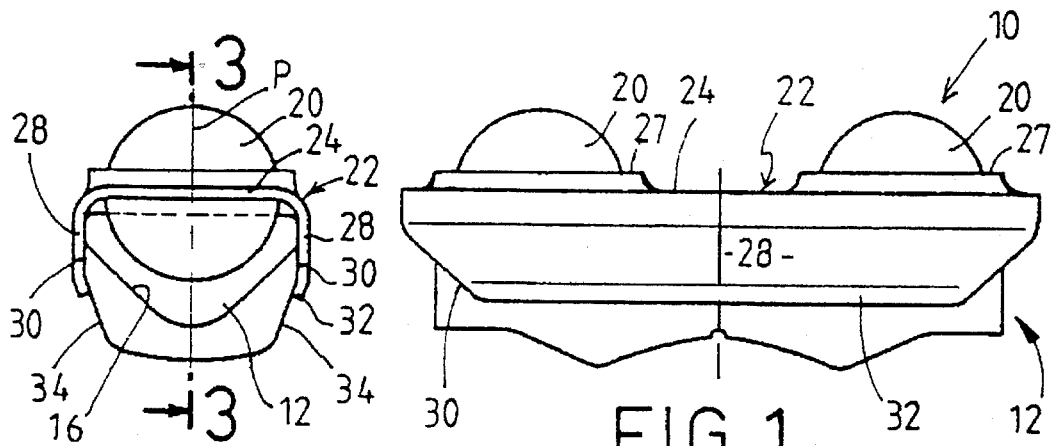
FIG. 1 is a lateral elevational view of a first embodiment of an intermediate roller element produced in accordance with the teachings of the invention.
FIG. 2 is a right-hand lateral view of the roller element illustrated in FIG. 1.
Figure 3:
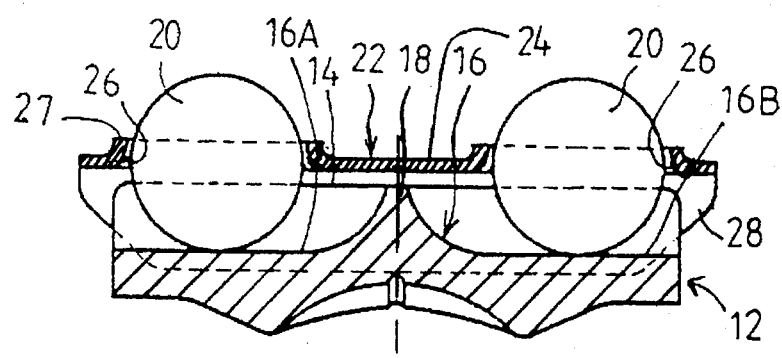
FIG. 3 is a sectional view taken on line 3—3 of FIG. 2.

FIGS. 1 to 3 represent an intermediate roller element 10 intended to equip a universal joint of the type described and represented in document FR-A-2,580,751, the content of which reference may be made in order to know the design and production details of a ball-type triplane universal joint.

Each intermediate element 10 includes a sole-plate produced in the form of a strip of an overall elongate parallelepipedal shape.

A strip 12 includes, on its upper longitudinal face 14, a roller track 16a which, in the embodiment illustrated in FIGS. 1 to 3 and 10, is divided into two tracks 16A and 16B by a projecting intermediate partition 18 which is arranged substantially in the middle of the strip 12.

Each of the two tracks 16A, 16B receives a ball 20 that can roll thereon.

The two balls 20 are held by a cage 22, which is essentially made up of a plate 24 substantially parallel to the plane of the upper longitudinal face 14 of the strip 12, and in which two cells 26 are formed, each one of which receives a ball 20.

In this embodiment, each cell is produced partially in the form of a dish 27 such that the balls are retained by the cage, that is to say that cannot escape upwards when considering the figures.

In accordance with the teachings of the invention, the plate 24 is extended, on either side of the strip 12, by two lateral tabs 28 each of which extends vertically downwards from the plate 24 along a lateral face 30 of the strip 12. The end 32 of each lateral tab 28 is slightly curved in the direction of the median plane of symmetry P of the intermediate element 10 such as to constitute a retaining spur which extends facing an inclined surface portion 34, formed at the lower part of the strip in an extension of the vertical planar part of the lateral face 30. The lateral faces 30 are received with a slight clearance with the internal faces opposite the lateral tabs 28 such as not to detract from the rolling capability of the balls 20 along the tracks 16A and 16B.

The interaction of the ends 32 with the inclined surfaces 34 prevents the cage 22 and the balls 20 from detaching from the strip 12 in a direction perpendicular to the plane of the upper face 14. The intermediate element 10 thus constitutes a unit sub-assembly which can be assembled independently of the joint and then installed when the joint is assembled.

The choice of material of the cage 22 is such that the lateral tabs 28 may be deformed elastically so as to allow the cage 22 with the balls 20 to be installed on the strip 12 by elastically clipping it on from the top downwards when considering the figures.

The displacements of the case 22 and of the balls 20 with respect to the strip 12 are also limited in the direction of rolling of the balls by the central projection 18, against which one or the other of the balls 20 can come into abutment.

Figure 10:
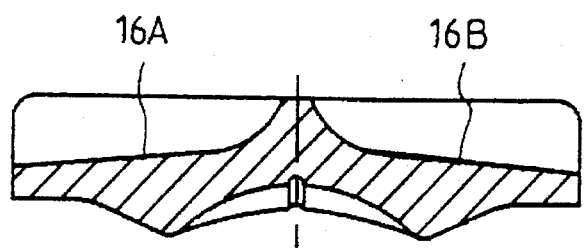
FIG. 10 illustrates a variant of the shape of a roller track.

In the variant illustrated in FIG. 10, the tracks 16A and 16B are slightly inclined so as to allow automatic recentering of the cage 22 with respect to the strip 12 when the joint is in operation.

In the second embodiment illustrated in FIGS. 4 to 6 and 11, a roller track 16a is a continuous straight track.

A means for limiting the displacement of the cage 22a with respect to a strip 12a in the longitudinal rolling direction of the balls is made up of at least one stop piece 36, which is formed on at least one lateral face 30 of the strip 12a so that it projects. It is received with a clearance between vertical edges 38 of the cage 22, which longitudinally define a window 40 formed in the lateral tab 28a of the cage 22a.

In order to simplify the assembly of the intermediate roller element 10 and make use of symmetrical components, projecting stop pieces 36 are preferably arranged symmetrically on each of the lateral faces 30 of the strip 12a, and they are each received in a window 40 in corresponding lateral tabs 28a of the cage 22a.

In the embodiment illustrated in FIG. 11, a track 16a includes two inclined lengths 16Aa and 16Ba which provide automatic recentering of the cage 22 with respect to the strip 12 when the joint is in operation.

Figure 8:
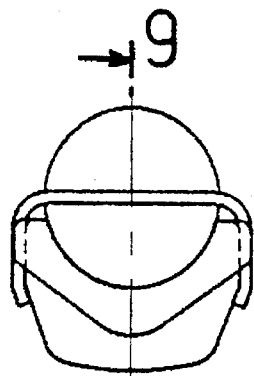
FIG. 8 is a right-hand lateral view of the roller element illustrated in FIG. 7.
Figure 7:
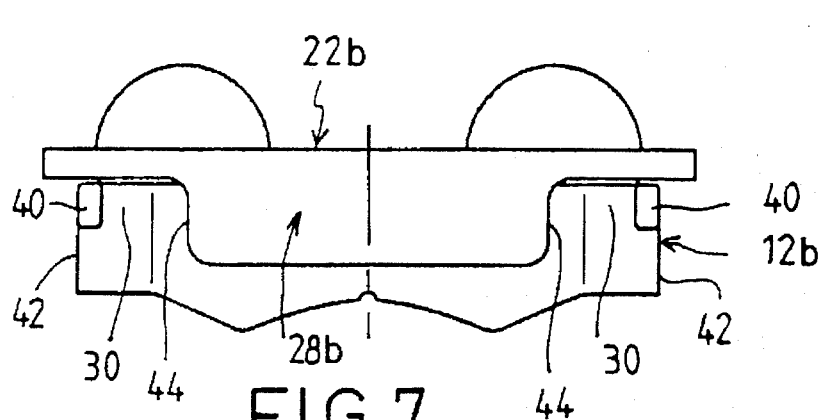
FIG. 7 is a lateral elevational view of a third embodiment of an intermediate roller element produced in accordance with the teachings of the present invention.
Figure 9:
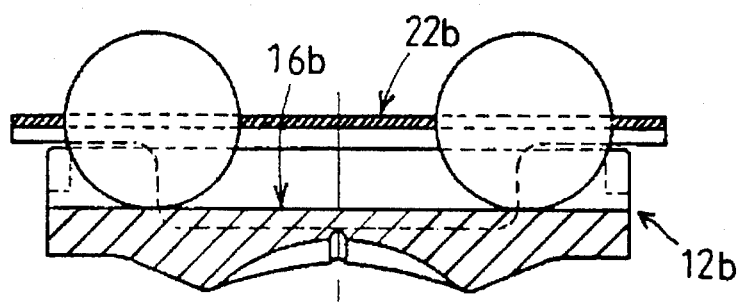
FIG. 9 is a sectional view taken on line 9—9 of FIG. 8.

In the third embodiment illustrated in FIGS. 7 to 9, the means for limiting the displacement of a cage 22b with respect to a strip 12b in the longitudinal rolling direction of the balls is made up of two longitudinal stop pieces 40 arranged respectively in the vicinity of transverse end faces 42 of the strip 12b. They are formed on the lateral faces 30 so that they project.

Each lateral tab 28b of the cage 22b possesses a reduced length with respect to that of the tabs illustrated in FIGS. 1 to 4, such that it is received with a clearance between the stop pieces 40. Vertical end edges 44 of the tabs 28b are thus capable of interacting with one or the other of the stop pieces 40, depending on the displacement of the cage 22b with respect to the strip 12b.

Figure 12:
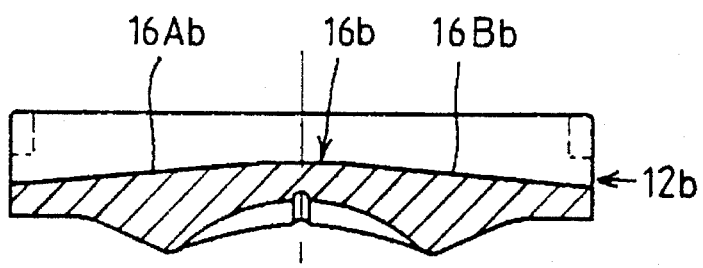
FIG. 12 illustrates a yet further variant of a roller track according to the present invention.

In the variant illustrated in FIG. 12, the roller track 16b includes two oppositely inclined lengths 16Ab and 16Bb which bring about automatic recentering of the cage 22 with respect to the strip 12 when the joint is in operation.

We claim:

1. An intermediate roller assembly, comprising:
   a strip having one face which includes at least one roller track that extends longitudinally of said strip;
   a plurality of roller elements in rolling contact with said at least one track; and
   a cage comprising a plate that generally extends in a plane that is substantially parallel to said at least one roller, track and a plurality of cells in which said roller elements are respectively received, said cage comprising means cooperating with said strip for maintaining said roller elements on said at least one track such that said strip, said roller elements and said cage form a unitary assembly.

2. The intermediate roller element of claim 1, wherein said means for maintaining comprises two opposing lateral tabs that extend from a longitudinal edge of said cage and have free ends which interact with respective retaining surfaces formed on opposite sides of said strip so as to restrict movement of said cage relative to said strip in a direction substantially perpendicular to said track.

3. The intermediate roller element of claim 2, wherein said two opposing lateral tabs extend along lateral faces of said strip, said retaining surfaces being formed on said lateral faces opposite to said lateral tabs.

4. The intermediate roller element of claim 3, wherein at least one of said cage and said strip further comprises a means for limiting displacement of said cage with respect to said strip in the longitudinal rolling direction of said roller elements in the longitudinal direction of said strip.

5. The intermediate roller element of claim 4, wherein said means for limiting displacement of said cage with respect to said strip in the longitudinal rolling direction of said roller elements comprises a stop piece formed on said at least one track that projects outwardly of said at least one track and divides said at least one track into two tracks, each of said tracks having at least one said roller element thereon.

6. The intermediate roller element of claim 1, wherein each of said plurality of cells has a shape which holds a respective one of said plurality of roller elements and maintains said roller elements as part of said unit assembly.

7. The intermediate roller element of claim 1, wherein said roller elements are balls.

8. An intermediate roller assembly, comprising:
   a strip having one face which includes at least one roller track that extends longitudinally of said strip;
   a plurality of roller elements in rolling contact with said at least one track;
   a cage comprising a plate that generally extends in a plane that is substantially parallel to said at least one roller track, a plurality of cells in which said roller elements are respectively received, and means cooperating with said strip for maintaining said roller elements on said at least one track such that said strip, said roller elements and said cage form a unitary assembly;
   wherein said means for maintaining comprises two opposing lateral tabs that extend from a longitudinal edge of said cage and have free ends which interact with respective retaining surfaces formed on opposite sides of said strip so as to restrict movement of said cage relative to said strip in a direction substantially perpendicular to said track;
   wherein said two opposing lateral tabs extend along lateral faces of said strip, said retaining surfaces being formed on said lateral faces opposite to said lateral tabs;
   wherein at least one of said cage and said strip further comprises a means for limiting displacement of said cage with respect to said strip in the longitudinal rolling direction of said roller elements in the longitudinal direction of said strip; and
   wherein said means for limiting displacement of said cage with respect to said strip in the longitudinal rolling direction of said roller elements comprises at least one fixed stop piece formed on said strip and at least one stop surface on said cage, said fixed stop piece being capable of interacting with said at least one stop surface.

9. The intermediate roller element of claim 8, wherein said at least one fixed stop piece comprises at least one fixed projecting stop piece projecting from one of said lateral faces of said strip, and said at least one stop surface on said cage comprises two stop-piece surfaces forming longitudinal end edges of a window formed in one of said lateral tabs of said cage.

10. The intermediate roller element of claim 8, wherein said strip has opposite longitudinal ends on one of said lateral faces thereof, said at least one fixed stop piece comprises stop pieces located at said opposite longitudinal ends of said lateral face, and one of said lateral tabs of said cage is received with a clearance between said stop pieces, said at least one stop surface being formed on the one of said lateral tabs of said cage.

11. An intermediate roller assembly, comprising:
a strip having one face which includes at least one roller track that extends longitudinally of said strip;
a plurality of roller elements in rolling contact with said at least one track;
a cage comprising a plate that generally extends in a plane that is substantially parallel to said at least one roller track, a plurality of cells in which said roller elements are respectively received, and means cooperating with said strip for maintaining said roller elements on said at least one track such that said strip, said roller elements and said cage forms unitary assembly; and
wherein said means for maintaining comprises lateral tabs on said cage that are elastically deformable such that said tabs can be elastically clipped on to said strip to hold said cage on said strip.

12. An intermediate roller assembly, comprising:
a strip having one face which includes at least one roller track that extends longitudinally of said strip and retaining surfaces on sides thereof;
a plurality of roller elements in rolling contact with said at least one track; and
a cage comprising a plate that generally extends in a plane that is substantially parallel to said at least one roller track, a plurality of cells in said plate and in which said roller elements are respectively received, and lateral tabs that extend from longitudinal edges of said plate and cooperate with said retaining surfaces of said strip such that said lateral tabs hold said plate and said plurality of roller elements on said strip, whereby said strip, said roller elements and said cage form an interconnected unitary assembly.

13. The intermediate roller element of claim 12, wherein at least one of said cage and said strip further comprises a means for limiting displacement of said cage with respect to said strip in the longitudinal rolling direction of said roller elements in the longitudinal direction of said strip.

14. The intermediate roller element of claim 12, wherein said means for limiting displacement of said cage with respect to said strip in the longitudinal rolling direction of said roller elements comprises a stop piece formed on said at least one track that projects outwardly of said at least one track and divides said at least one track into two tracks, each of said tracks having at least one said roller element thereon.

15. An intermediate roller assembly, comprising:
a strip having one face which includes at least one roller track that extends longitudinally of said strip and retaining surfaces on sides thereof;

a plurality of roller elements in rolling contact with said at least one track;
a cage comprising a plate theft extends in a plane that is substantially parallel to said at least one roller track, a plurality of cells in said plate and in which said roller elements are respectively received, and lateral tabs that extend from longitudinal edges of said plate and cooperate with said retaining surfaces of said strip such that said lateral tabs hold said plate and said plurality of roller elements on said strip, whereby said strip, said roller elements and said cage form an interconnected unitary assembly; and
wherein said strip tapers away from said track at said retaining surfaces, said lateral tabs extend from a position adjacent to said track to said retaining surfaces, and said lateral tabs extend inwardly toward said retaining surfaces at distal ends thereof so as to be capable of holding said cage on said strip.

16. The intermediate roller assembly of claim 15, wherein said lateral tabs are elastically deformable.

17. An intermediate roller assembly, comprising:
a strip having one face which includes at least one roller track that extends longitudinally of said strip and retaining surfaces on sides thereof;
a plurality of roller elements in rolling contact with said at least one track;
a cage comprising a plate that extends in a plane that is substantially parallel to said at least one roller track, a plurality of cells in said plate and in which said roller elements are respectively received, and lateral tabs that extend from longitudinal edges of said plate and cooperate with said retaining surfaces of said strip such that said lateral tabs hold said plate and said plurality of roller elements on said strip, whereby said strip, said roller elements and said cage form an interconnected unitary assembly;
wherein at least one of said cage and said strip further comprises a means for limiting displacement of said cage with respect to said strip in the longitudinal rolling direction of said roller elements in the longitudinal direction of said strip; and
wherein said means for limiting displacement of said cage with respect to said strip in the longitudinal rolling direction of said roller elements comprises at least one fixed stop piece formed on said strip and at least one stop surface on said cage, said fixed stop piece being capable of interacting with said at least one stop surface.

18. The intermediate roller element of claim 17, wherein said at least one fixed stop piece comprises at least one fixed projecting stop piece projecting from one of said lateral faces of said strip, and said at least one stop surface on said cage comprises two stop-piece surfaces forming longitudinal end edges of a window formed in one of said lateral tabs of said cage.

19. The intermediate roller element of claim 17, wherein said strip has opposite longitudinal ends on one of said lateral faces thereof, said at least one fixed stop piece comprises stop pieces located at said opposite longitudinal ends of said lateral face, and one of said lateral tabs of said cage is received with a clearance between said stop pieces, said at least one stop surface being formed on the one of said lateral tabs of said cage.

* * * * *